Figure 1:
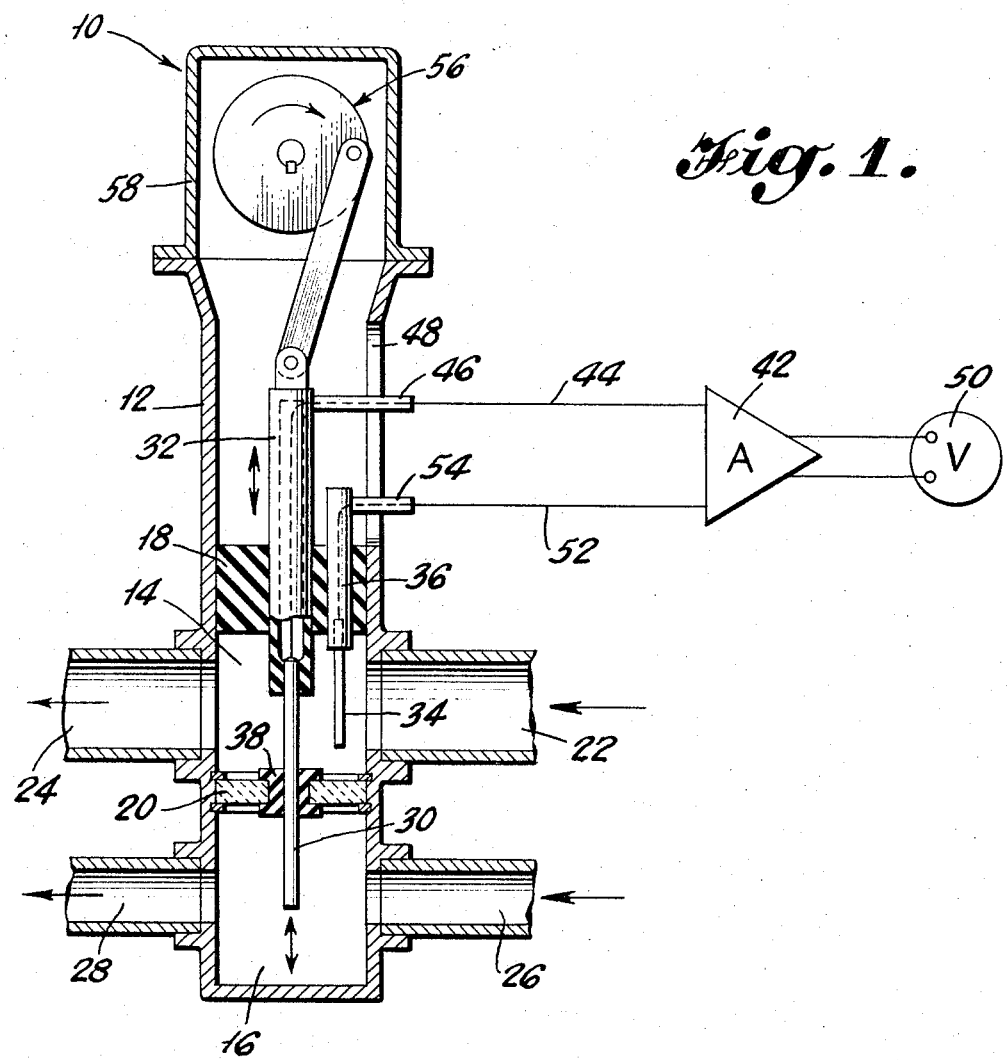

Jan. 23, 1968  H. G. WEYLAND  3,365,376
APPARATUS AND METHOD FOR THE CONTINUOUS MEASUREMENT
OF THE ION CONCENTRATION IN A LIQUID
Filed Nov. 11, 1966  3 Sheets-Sheet 1

INVENTOR
Herman G. Weyland

BY Stevens, Davis, Miller & Mosher
ATTORNEYS

Jan. 23, 1968     H. G. WEYLAND     3,365,376
APPARATUS AND METHOD FOR THE CONTINUOUS MEASUREMENT
OF THE ION CONCENTRATION IN A LIQUID
Filed Nov. 11, 1966     3 Sheets-Sheet 3

INVENTOR.
HERMAN G WEYLAND
BY
ATTORNEY 3,365,376
APPARATUS AND METHOD FOR THE CONTINUOUS MEASUREMENT OF THE ION CONCENTRATION IN A LIQUID
Herman G. Weyland, Arnhem, Netherlands, assignor to American Enka Corporation, Enka, N.C., a corporation of Delaware
Continuation-in-part of application Ser. No. 365,410, May 6, 1964. This application Nov. 11, 1966, Ser. No. 600,337
Claims priority, application Netherlands, May 16, 1963, 292,885
10 Claims. (Cl. 204—1)

This application is a continuation-in-part of copending application Ser. No. 365,410, filed May 6, 1964, now abandoned.

This invention relates to a method for the continuous measurement of the ion concentration in a solution of an electrolyte with the aid of a reciprocating sensing electrode. The invention also relates to an apparatus including the sensing electrode for carrying out the desired ion concentration measurement.

Methods previously have been proposed for determining the ion concentration of a solution with a sensitive electrode. Such methods are based on the fact that the potential difference between such an electrode and the solution being examined is dependent upon the ion activity to which the electrode is sensitive, which dependence is expressed in the formula:

$$E = \frac{RT}{F} \ln a$$

where
$E$ = the above-mentioned potential difference;
$R$ = the gas constant (=8.3 joules);
$T$ = the absolute temperature;
$F$ = the charge of the ions (96,500 coulombs per univalent gram-ion); and
$a$ = the activity of the ions involved.

By measuring the above-described potential difference for a solution, and using the above formula, the activity of the ions in the solution may be calculated, and from the activity the ultimately desired value of the ion concentration can be obtained.

Prior methods of the above type have been of special importance for the measurement of the hydrogen ion concentration. As appears from the above formula, it would be possible in principle to measure directly the hydrogen ion concentration in a solution with a device such as a pH meter. The drift of such previously available apparatus, however, is too great to permit long-term continuous measurement of small variations in concentration to be satisfactorily accurate. The same disadvantage applies to the previously attempted electrometric measurement of concentrations of other ions.

Accordingly, it is the primary object of the present invention to provide an improved method for measuring ion concentrations of solutions wherein the disadvantages attendant similar previously available techniques are obviated.

Another object of the present invention is to provide an improved method for measuring the ion concentration of solutions of electrolytes wherein satisfactorily accurate determinations advantageously may be carried out continuously over extended periods of time.

It is a further object of the present invention to provide an improved method for determining the ion concentrations of solutions wherein the undesirable effects of drift in the measuring apparatus employed are appreciably minimized.

It is a particular object of the present invention to provide an improved method for more accurately measuring the ion concentration of solutions, as compared to techniques heretofore available, whereby a desired actual control of the ion concentrations of the solutions may be achieved.

Still another object of the present invention is to provide an improved apparatus for measuring ion concentrations of solutions by which a more accurate determination thereof is possible as compared to those indicative of previously proposed measuring devices.

Broadly described, the present invention provides an improved method for measuring the ion concentration of a solution of an electrolyte which comprises passing at a constant frequency a sensing electrode back and forth between a bath or flowing stream of said solution to be measured and a bath of a reference solution of known ion concentration, said electrode during said passage being alternately reciprocated essentially out of one of said baths and into the other thereof, to develop a voltage having an A.C. component, said A.C. component of said voltage being an indication of the difference between the ion concentrations of said baths, amplifying said A.C. component of said voltage, and measuring said amplified A.C. component.

In measuring the ion concentration of a solution in the manner of the present invention, a satisfactorily accurate measurement of the ion concentration can be made. This advantageously is the case even over relatively long periods of time when the proper precautions, to be described hereinafter, are taken. In the method of the present invention, drift, which undesirably hampered previous measuring techniques, is essentially eliminated.

According to the method of the invention, a suitable electrical circuit is established between the baths. The circuit includes a reciprocating sensing electrode and a second or reference electrode positioned in the solution to be measured. The sensing electrode must be reciprocated regularly back and forth between the bath to be measured and the reference bath. The frequency at which the electrode is reciprocated must be sufficiently high to produce an A.C. component of the voltage which can be measured selectively with an A.C. amplifier, whereas the residence time of the electrode in the baths must be such that a state of equilibrium is reached between the electrode and the respective liquids. It has been found that very good results are obtained if said frequency is about 1 cps., and such frequencies therefore are preferred.

The electrodes must be formed of a material which is inert with respect to the solutions. The measurement, according to this invention, of the hydrogen ion concentration of a solution, hence, suitably may be carried out with the aid of the conventional electrodes used for this purpose, e.g., a platinum electrode or a quinhydrone electrode. By preference, however, advantageous and reliable use is made of a less expensive glass electrode as the sensing electrode. The second or reference electrode which is necessary to complete an electrical circuit may be a calomel electrode.

The sensing electrode preferably has a circular cross section and is transferred from one bath to the other in such a manner that the sensing electrode is caused to reciprocate along its axis through an opening in an elastic diaphragm or grommet which closely fits around the periphery of the electrode, the solution to be measured being on one side of the diaphragm and the reference solution on the other. In this way the closely fitting elastic diaphragm or grommet frees the reciprocating electrode to a great extent of adhering liquid of the bath from which the electrode is being removed and minimizes problems arising due to the reference liquid becoming contaminated. In order to prevent the measuring results from becoming unfavorably influenced by contamination of the reference solution, it is preferred to regularly renew the reference bath or to adjust the concentration thereof to essentially the initial value. This may be done advantageously by continuously feeding to the reference solution bath a small stream of fresh reference solution and withdrawing therefrom an equal amount of possibly contaminated reference solution.

Since the voltage developed is dependent upon the temperature, the bath to be measured and the reference bath preferably should have the same temperature. This advantageously may be realized by providing, as the container for the reference bath, a small uninsulated chamber and positioning the reference bath chamber such that it is supported within and completely surrounded by the solution of the bath to be measured.

Preferably, the reference bath is such that it is characterized by being a solution containing ions having the same activity coefficient as that of the ions in the solution to be measured. With the two baths having the same temperature and the same activity coefficient of the ions to be meausred, the amplitude of the above-mentioned A.C. component produced in the reciprocating electrode is a measure of the deviation of the ion concentration in the bath to be measured from that of the reference bath. The magnitue of the deviation easily can be determined empirically before-hand by calibration of the apparatus to be used with the aid of a number of baths of known composition.

The method according to the present invention is of special importance for the measurement of the acid concentration in spinning baths which are used in the manufacture of regenerated cellulose by the viscose process. In such cases it is preferred to utilize a reference bath having a composition equal to that of the desired spinning bath. The A.C. component measured in accordance with the present method may then be used for the control of a correction apparatus for the acid concentration of the spinning bath. To this end, the correction apparatus is adjusted to operate so that the A.C. component measured is always as small as possible and preferably is equal to zero.

With the method according to the invention, the ion concentration actually is not measured directly; the activity is the property directly measured. Hence, a reference bath is employed which contains ions having an activity coefficient equal to that of the ions to be measured. This may be realized in that the reference bath preferably is given a composition which is substantially equal to that desired for the solution to be measured, or is given a composition which equals the mean expected composition of the solution to be measured.

With various processes it is not necessary or desired that the ion concentration of a given solution be constant but it is desired to control the ion activity. For instance, with certain viscose spinning processes the acid concentration is not the variable which is most important. In such instances the important property of the bath is the activity of the hydrogen ions, which as is known, is depedent on the presence of salts in the spinning bath. In processes of this type it is therefore preferred to measure the ion activity and not the ion concentration.

When the measurement is carried out in such a spinning bath it is also possible to measure continuously the concentrations of other ions in a manner appropriate to the ions measure, and the quantities measured may, with the aid of operational amplifiers, be used to convert the voltages measured into the acid content of the solution.

The invention relates not only to the above-mentioned method, but also to an apparatus for carrying out said method. Said apparatus comprises an electrical circuit including a sensing electrode suitable for measuring ion concentrations and a reference electrode and two chambers which are partitioned by an elastic diaphragm. One chamber contains the reference solution bath and the other the bath of the solution to be measured. In the elastic diaphragm an opening is provided in which the sensing electrode is positioned. The sensing electrode is mechanically coupled to a driving means which causes the electrode to reciprocate along its axis in its longitudinal direction so that at least part of the sensitive portion thereof alternately is in the one chamber and in the other. The electrodes are electrically coupled to an A.C. amplifier.

It will be apparent that the method according to the invention may also be used for the measurement of differences in concentration between two liquids of unknown composition. In that case the reference liquid will have an unknown and possibly variable composition.

Figure 2:
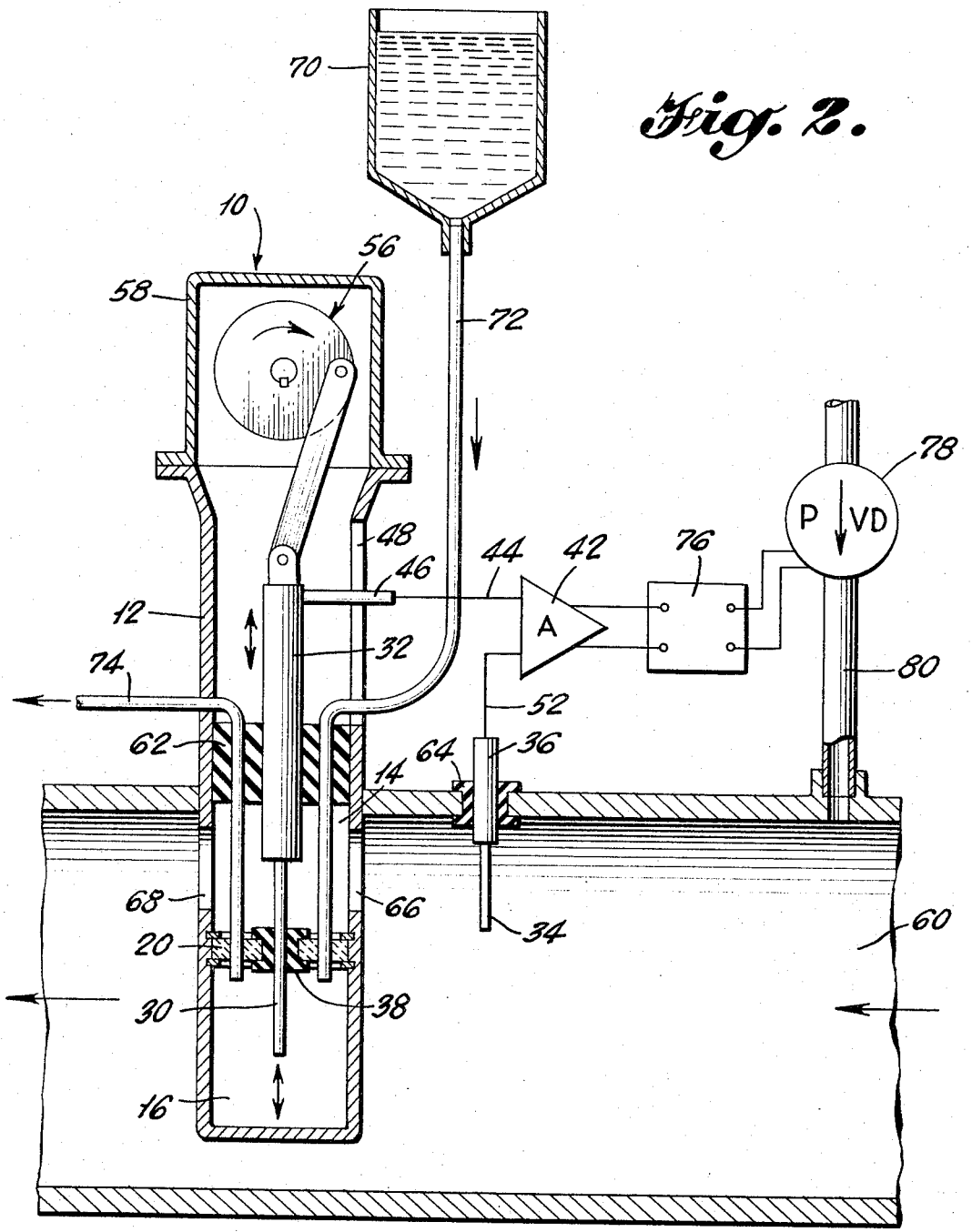
Figure 3:
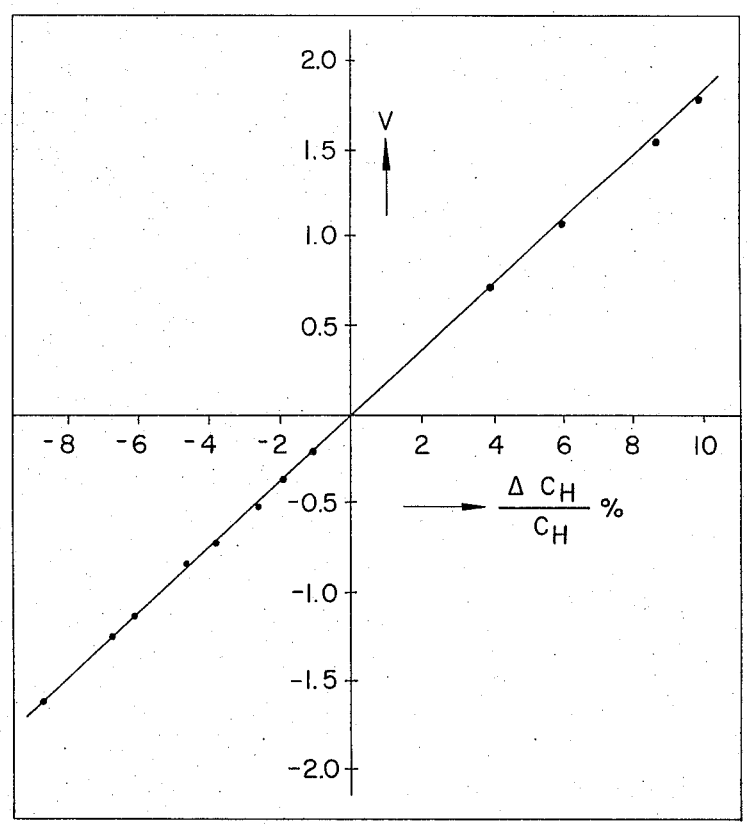

The invention will be more fully understood from the following detailed description of embodiments thereof and reference to the accompanying drawings of which:

FIGURE 1 is a schematic view partially in section of an embodiment of the ion concentration measuring apparatus of the invention;

FIGURE 2 is a schematic view partially in section of another embodiment of the ion concentration measuring apparatus of the invention in an arrangement including a control system for making adjustments in the composition of solution in a flowing liquid line being measured; and FIGURE 3 is a graph of alternating voltage values (V) measured in one embodiment of the process of the invention for variations in the composition of a viscose spinning bath.

Referring now to the drawings and more particularly to FIGURE 1, reference numeral 10 generally designates an apparatus in accordance with the present invention for the measurement of ion concentrations. The apparatus includes a casing 12 which at its lower end is divided into chambers 14 and 16 by upper and lower partitions 18 and 20. The solution to be measured enters and leaves chamber 14 through conduits 22 and 24, respectively. A reference liquid may enter and leave chamber 16 by conduits 26 and 28, respectively. A sensing electrode 30 which is connected at its upper end to a support holder 32 and a reference electrode 34 which is connected at its upper end to a support holder 36 are positioned within casing 12. The electrode support holders 32 and 36 are sealingly but movably mounted in apertures in partition 18, which partition may be made of rubber or similar material. As shown in FIGURE 1, the lower end of the sensing electrode 30 extends through a rubber grommet 38 in the partition 20 into the chamber 16 for the reference solution.

The sensing electrode 30 is connected to an A.C. amplifier 42 by a wire 44 which runs through the support holder 32 and a protective tube 46 which projects out through an opening 48 in the casing 12. The amplifier 42 is in turn electrically coupled to an alternating voltage meter 50. A wire 52 connects the amplifier to the second or reference electrode 34 through a protective tube 54 and support holder 36. To complete an electrical circuit, partition 20 or at least a part thereof is made of an ion permeable substance such as unglazed porcelain. Instead, it is also possible to have the bottom of chamber 16 made up of an ion permeable substance.

A crank drive mechanism 56 which is positioned within a housing 58 at the upper end of casing 12 may be employed to vertically reciprocate the sensing electrode 30 at a given frequency. The sensing electrode may be vertically reciprocated alternately in and out of chambers 14 and 16, and the A.C. component of the voltage thereby produced in the circuit is amplified by amplifier 42 and is indicated at the voltage meter 50. It is presently preferred that the stroke of the crank drive mechanism be regulated so that when the sensing electrode 30 is moved downwardly to its lowest position, the electrode is completely within chamber 16 with the bottom end of support holder 32 abutting the grommet 38.

FIGURE 2 illustrates another embodiment of the present invention in which like reference numerals are employed to designate corresponding elements described in connection with the FIGURE 1 embodiment. In FIGURE 2, the casing 12 projects into the interior of a conduit 60 in which the liquid to be measured is flowing. In this embodiment, the support holder 32 of the sensing electrode is mounted within an elastic partition 62 in casing 12, and the support holder 36 of the reference electrode is sealingly but removably positioned within a rubber grommet 64 in the wall of conduit 60.

In FIGURE 2, the chamber 16 containing the reference solution is completely surrounded by a spinning bath solution or other solution to be measured. As a result, the reference bath in chamber 16 and the solution flowing in conduit 60 have the same temperature so that corrections for differences in temperature are not necessary.

The solution in conduit 60 enters and leaves chamber 14 through openings 66 and 68 in casing 12. Fresh reference solution may be supplied to chamber 16 from a supply vessel 70 through a line 72 which extends through the opening 48 in casing 12 and through apertures in partitions 20 and 62. Possibly contaminated reference solution leaves the chamber 16 by way of line 74.

In this embodiment, the alternating voltage which is produced by reciprocation of the sensing electrode, and which is a measure of the deviation of the ion concentration of the solution flowing in conduit 60 from that of the reference solution, is amplified in amplifier 42. A control device 76, which is connected to amplifier 42 and to a metering pump 78 in a line 80, utilizes the amplified alternating voltage to control the flow of a correction liquid through line 80 into conduit 60.

The invention having been described above in detail, the following example is given to show an embodiment of the method thereof. It will be understood that the example is given for illustrative purposes and not by way of limitation.

An apparatus as shown in FIGURE 1 was used for the measurement of the hydrogen ion concentration of a liquid having a spinning bath composition as is used in the viscose rayon industry. As a reference solution or bath, an aqueous liquid containing 4.635% by weight of sulphuric acid, 12.554% by weight of sodium sulphate, and 4.346% by weight of zinc sulphate was employed. The temperature of the bath to be measured and of the reference bath was 22° C. The reference bath was passed through chamber 16 of the apparatus at a rate of 10 ml./hr.

A glass sensing electrode was transferred alternatingly to and from the bath to be measured and the reference bath at a frequency of 1 c.p.s. The concentration of the hydrogen ions in the liquid to be measured was adjusted a few times to given values which deviated from that of the reference bath and the alternating voltages produced were recorded. The alternating voltage values thus measured (V) were plotted against the values in percentage of $\Delta CH/CH$ where $CH$ is the concentration of hydrogen ions in the reference liquid and $\Delta CH$ is the difference between this concentration and that of the bath being measured. In this way a straight line was obtained as is shown in FIGURE 3.

In this experiment the concentrations of zinc sulphate and sodium sulphate in the bath measured were kept constant. It may be derived from the graph of FIGURE 3 that using the above described procedure under otherwise equal conditions, $$V = 0.188 \cdot \frac{\Delta CH}{CH}$$

Since variations in the concentrations of the salts present influence the measuring results, the influence was ascertained by variations in the concentrations of zinc and sodium ions. It was found that if $V$ was plotted against $\Delta CNa/CNa$, the other conditions remaining the same, again a straight line was obtained from which it may be derived that $$V = -0.023 \cdot \frac{\Delta CNa}{CNa}$$

It was found that, under the given conditions, for the zinc ions $$V = 0.011 \cdot \frac{\Delta CZn}{CZn}$$

From the aforegoing, it was found that using the above-described procedure at 22° C. for the alternating voltage measured (in volts), $$V = 0.1888 \frac{\Delta CH}{CH} - 0.023 \frac{\Delta CNa}{CNa} + 0.011 \frac{\Delta CZn}{CZn}$$

This formula shows that at relatively small values of $\Delta CNa$ and $\Delta CZn$, the measured values of V may be used for the measurement of the acid concentration. This is certainly possible if, in actual viscose spinning, steps are taken to keep the concentrations of sodium and zinc ions as nearly constant as possible.

The graph of FIGURE 3 shows that the values of $\Delta CH/CH$ can be measured very accurately in the indicated range. When it was attempted to measure continuously the ion concentration of the spinning bath in the usual manner and with the aid of an identical pH meter, the inaccuracy of the measurement, mainly due to the drift, was substantial, at least equal to the entire range from −10% to +10% indicated in the graph. Contrary to the results so obtained, the method described advantageously could be used for several weeks without the measuring accuracy deteriorating.

It is to be understood that the foregoing detailed description is given merely by way of illustration and that many variations may be made therein without departing from the spirit of this invention.

What is claimed is:

1. A method for measuring the ion concentration of a solution of an electrolyte which comprises establishing an electrical circuit connecting said solution to be measured and a reference solution, said circuit including an ion concentration sensitive sensing electrode and a reference electrode, passing said sensing electrode back and forth at a predetermined frequency between said solution to be measured and said reference solution, said electrode during said passage between said baths developing a voltage having an A.C. component, said A.C. component of said voltage being an indication of the difference between the ion concentrations of said solutions, amplifying said A.C. component of said voltage, and measuring said amplified A.C. component.

2. The method according to claim 1 wherein said reference solution is of known ion concentration.

3. The method according to claim 1 further comprising maintaining said solution to be measured and said reference solution at essentially the same temperature.

4. The method according to claim 1 wherein during said passage of said electrode said electrode is caused to reciprocate along its axis in the longitudinal direction at a frequency of about one cycle per second.

5. The method according to claim 1 wherein said solution to be measured is a viscose spinning bath, and wherein said reference solution is of known concentration.

6. The method according to claim 1, further comprising maintaining the composition of said reference solution essentially constant by feeding into said reference solution fresh reference solution, and withdrawing an essentially equal amount of solution as that being fed.

7. An apparatus for measuring the ion concentration of a solution of an electrolyte comprising a chamber for the solution to be measured, a chamber for a reference solution, a diaphragm positioned to define a partition between said chambers, said diaphragm having an opening therein, a sensing electrode having portions thereof sensitive to ion concentration positioned within said opening in said diaphragm in slideably engaging but essentially liquid-sealing contact with said diaphragm, circuit means for establishing an electrical circuit between said solutions, said circuit means including said sensing electrode and a reference electrode positioned within said solution to be measured, means for reciprocating said sensing electrode along its axis in its longitudinal direction to cause at least part of said portions of said sensing electrode to be located in one of said chambers and then the other to generate an A.C. voltage component, means for amplifying A.C. voltage, and means for measuring A.C. voltage coupled to said amplifying means.

8. The apparatus according to claim 7 wherein said chamber for said reference solution is positioned within said chamber for said solution to be measured.

9. The apparatus according to claim 7 wherein said chamber for said reference solution is provided with means for introducing fresh reference solution into and withdrawing spent reference solution from said chamber.

10. The apparatus according to claim 7 wherein said chamber for said solution to be measured is provided with means for introducing thereinto a correction solution which alters the composition of said solution to be measured, and said means for measuring said A.C. voltage includes a means for controlling said introduction of said correction solution to an amount which adjusts to a predetermined value the composition of said solution to be measured.

References Cited
UNITED STATES PATENTS

| | | | |
|---|---|---|---|
| 1,786,196 | 12/1930 | Ennis | 324—30 |
| 2,438,963 | 4/1948 | Cunningham et al. | 204—222 |
| 2,726,670 | 12/1955 | Staunton | 137—93 |
| 3,007,861 | 11/1961 | Winters | 204—222 |
| 3,073,772 | 1/1963 | Wirz et al. | 204—195 |

HOWARD S. WILLIAMS, *Primary Examiner.*

JOHN H. MACK, *Examiner.*

T. TUNG, *Assistant Examiner.*